Oct. 31, 1961
E. B. FITCH
3,006,474
METHOD AND MEANS FOR CONVERTING THE
KINETIC ENERGY OF A FLUID STREAM
INTO RANDOM TURBULENCE
Filed Feb. 5, 1959
9 Sheets—Sheet 1
Fig. 2.
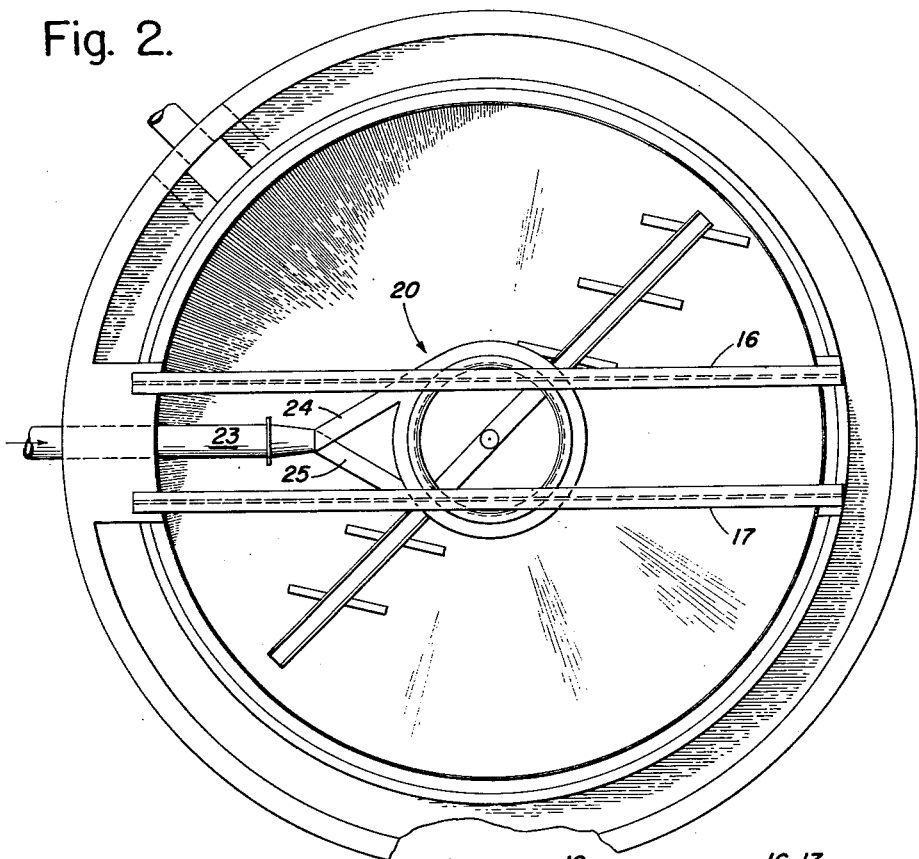
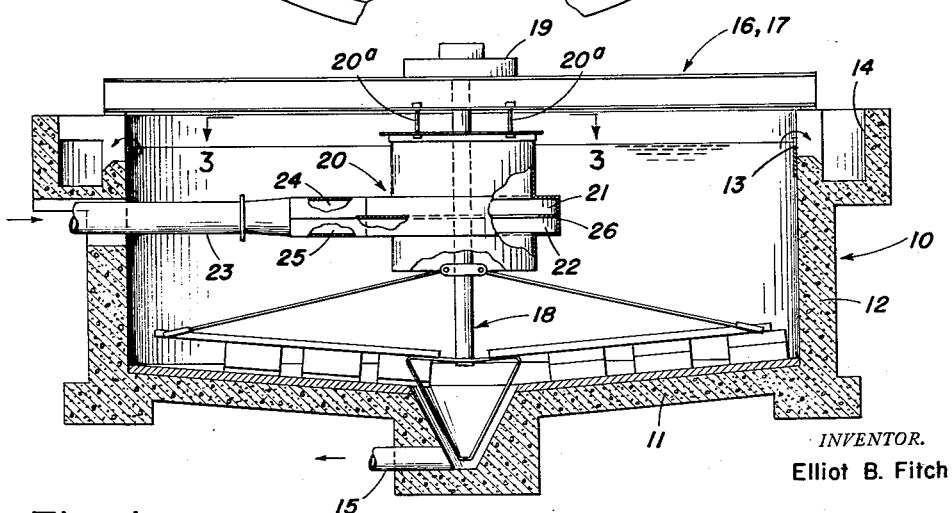
Fig. 1.
INVENTOR.
Elliot B. Fitch
BY Theodore M. Jablon
ATTORNEY INVENTOR.
Elliot B. Fitch

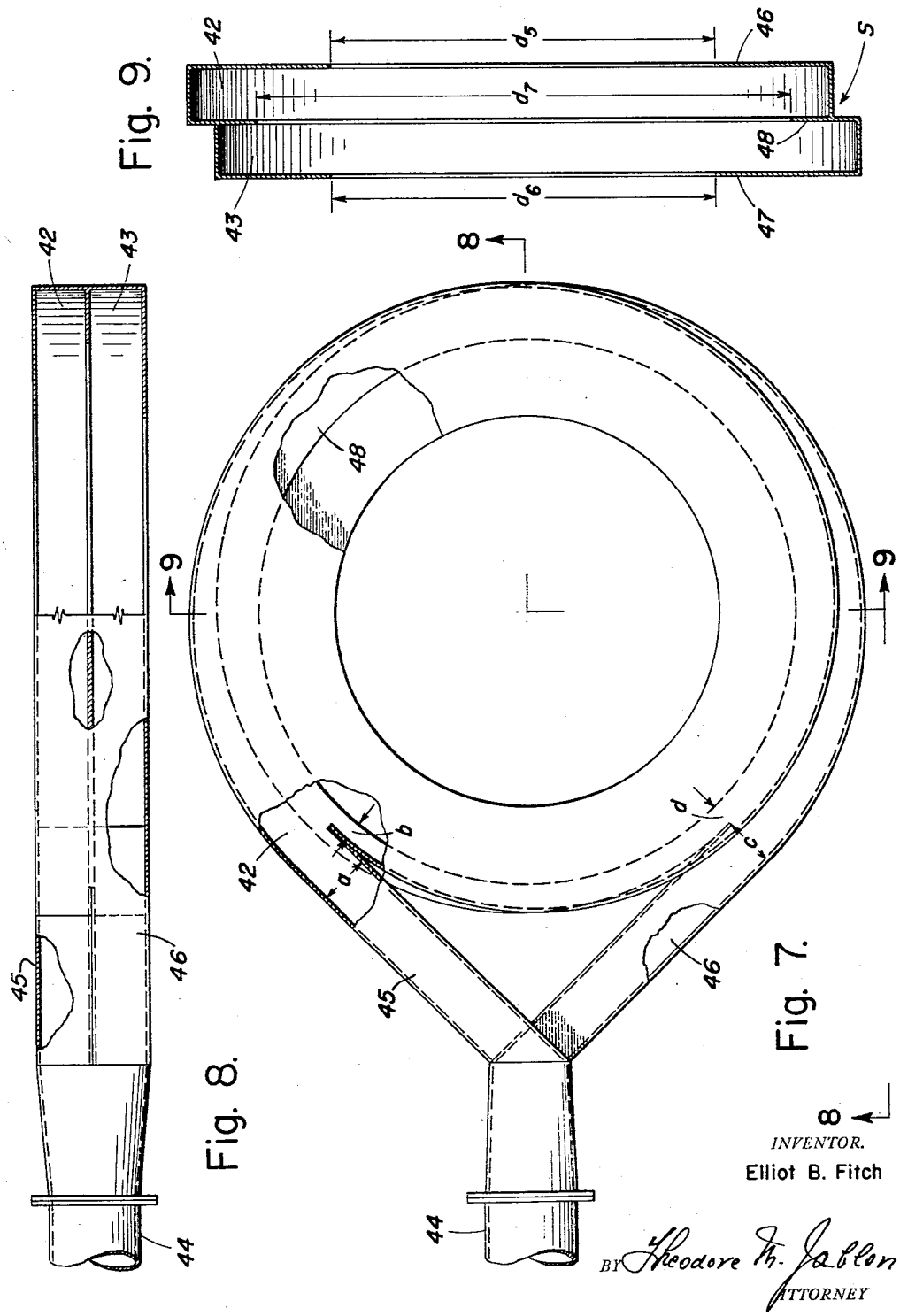

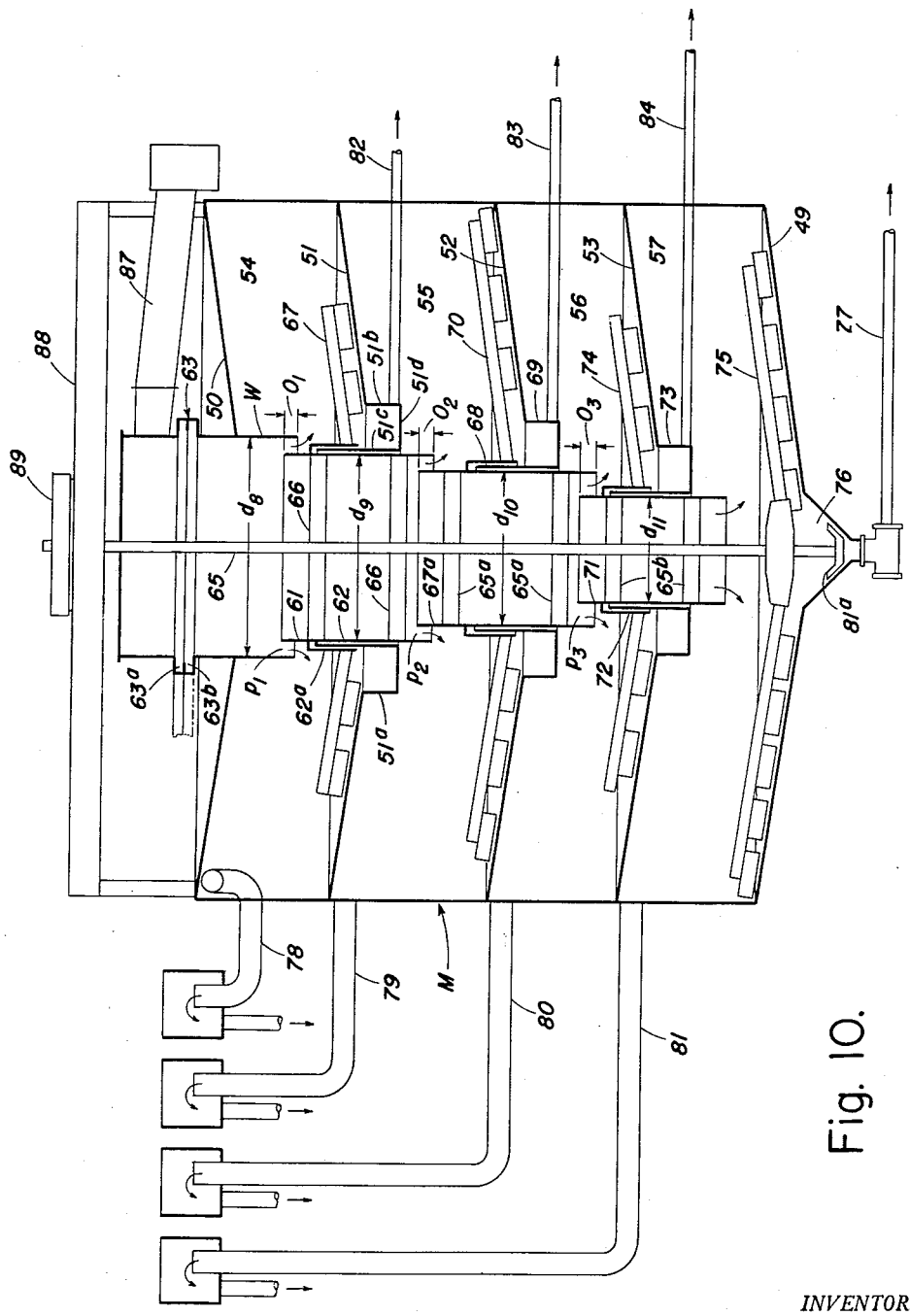

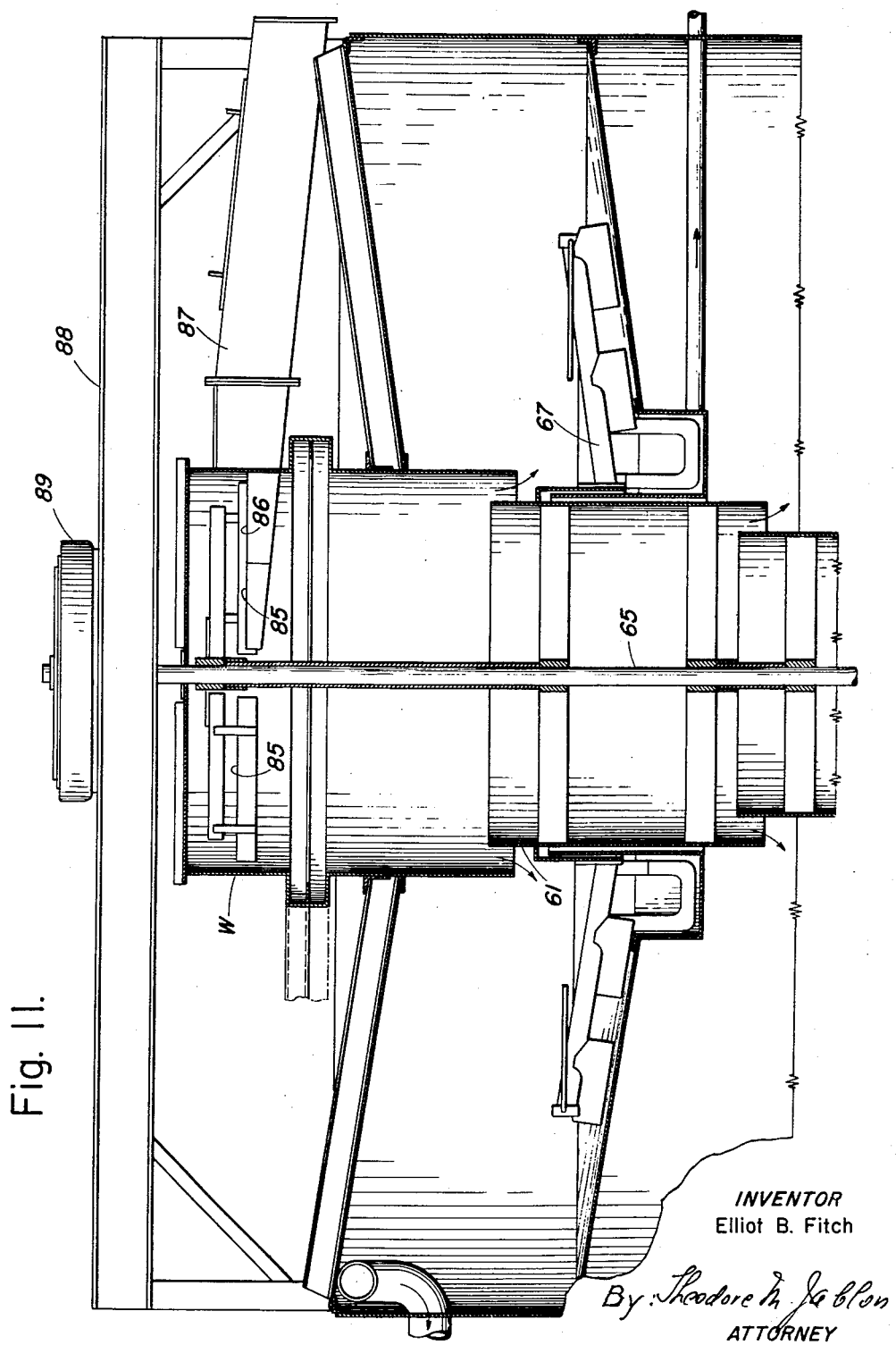

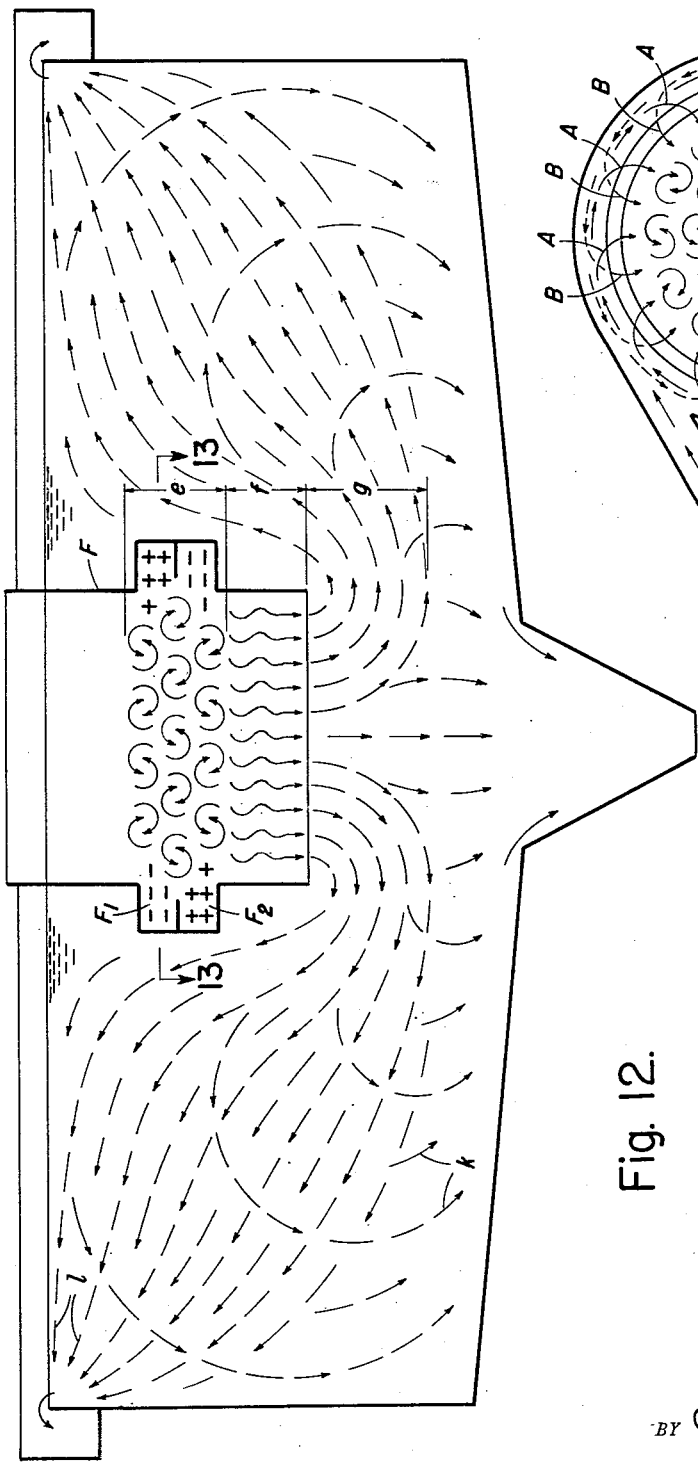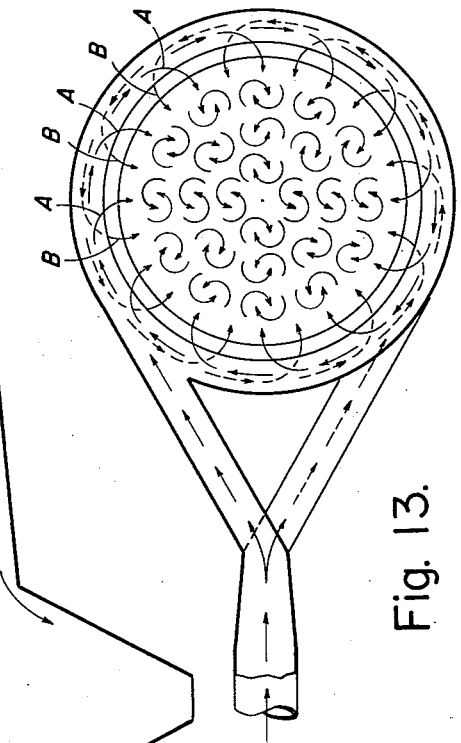
Fig. 12.
Fig. 13.
INVENTOR.
Elliot B. Fitch

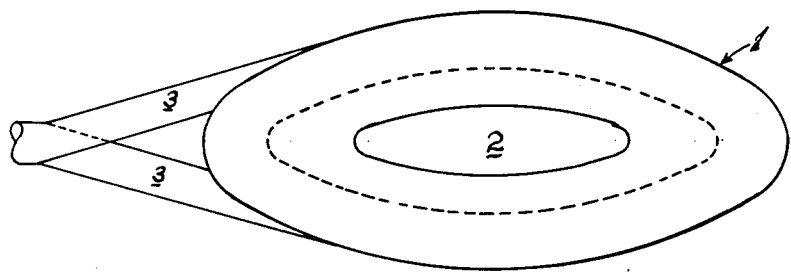
Fig 14
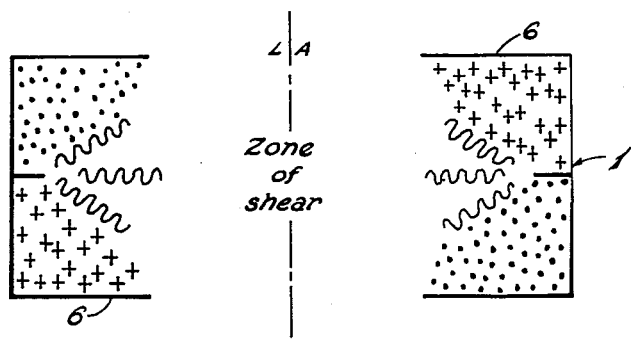
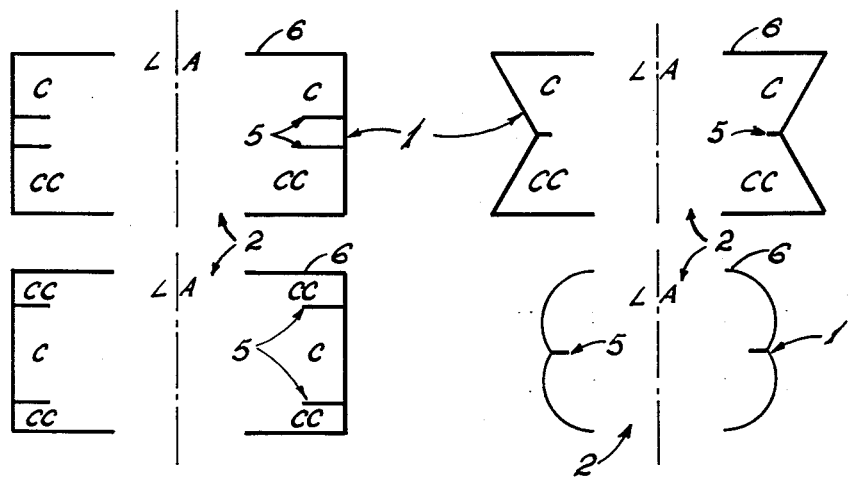
Fig. 15
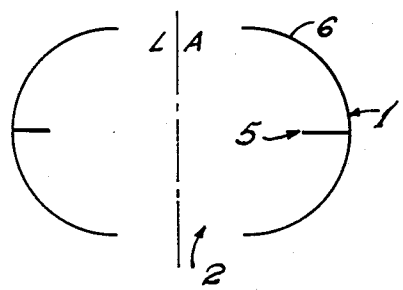
INVENTOR.
Elliot B. Fitch
BY William S. Henry INVENTOR.
Elliot B. Fitch 3,006,474
Patented Oct. 31, 1961

3,006,474
METHOD AND MEANS FOR CONVERTING THE KINETIC ENERGY OF A FLUID STREAM INTO RANDOM TURBULENCE
Elliot Bryant Fitch, Weston, Conn., assignor to Dorr-Oliver Incorporated, Stamford, Conn., a corporation of Delaware
Filed Feb. 5, 1959, Ser. No. 791,787
17 Claims. (Cl. 210—84)

This invention relates to a method and apparatus for converting the kinetic energy of a gaseous or liquid stream into random turbulence of fine grain or small scale eddies which decay rapidly and is a continuation-in-part of application Serial No. 567,620, filed February 24, 1956, now abandoned.

The method and apparatus according to this invention will have utility in flocculating solids suspended in a liquid, in mixing liquids, and in feeding liquid suspensions to a quiescent body for sedimentation separation or decantation.

As indicated above, this invention will find utility in many fields involving liquids and/or gases, however, for purposes of illustration, a preferred embodiment thereof will be hereinafter disclosed more fully in connection with a feedwell for a sedimentation clarifier or thickener as in the above identified parent application.

Expedients heretofore commonly used for dissipating the infeed velocity of a liquid stream entering a quiescent sedimentation body of liquid may be classified as follows:

(A) Stream deflecting baffles.
(B) Devices which break the feed stream into a number of smaller jets or streams.
(C) Impinging opposing jets or streams, one against the other.

Stream deflecting baffles will change the direction of a current, and also dissipate some part of the current velocity as turbulence. However, the eddies produced are of a large scale and persist for a considerable period of time.

Perhaps the most widely used expedient to dissipate the energy of a liquid stream is to divide it into a number of smaller jets by means of "picket fence" baffles. Unless the percentage of open area per unit area of the baffle is quite small, the current will pass through it with little apparent effect, and the individual jets will tend to coalesce down stream from the baffle to reconstitute the current. If the openings are made narrow and are widely spaced over the area of the baffle, the baffle will become more efficient, but as a practical matter, the openings become plugged and blinded within a short period of time.

Impinging opposed jets or streams has much the same effect as diverting a single stream with a baffle. It appears that this expedient produces a great deal more turbulence than would be produced by a single stream impinging on a baffle, but there is incomplete energy dissipation since there remains a substantial fraction of the original velocities of the two streams existing as redirected currents flowing away from the locus of impingement.

The energy diffusing apparatus according to this invention, as applied to a feedwell for a sedimentation tank, consists essentially of submerged raceways or channels juxtaposed one above the other within a feedwell and preferably, but not necessarily, of circular configuration. The main body of feed liquid is split into separate streams which are fed into the channels tangentially. One stream rotates clockwise and the other counter clockwise. The streams are displaced inwardly in opposite directions from the channels and are compelled to shear in a plane along the entire length of the channel at twice the velocity of either stream. The stream velocities are thereby instantaneously converted into random turbulence of small scale and if the streams are made equal but oppositely directed there are no residual tangential velocity components.

In the preferred embodiment of circular channels, the zone of shear will be in the form of disk-like plane concentric with the raceways. Since the liquid entering the raceways is introduced tangentially thereto and in opposite direction, centrifugal force will tend to contain the liquid within the raceways until it is substantially uniformly displaced by incoming liquid. In other words, the flow of liquid in the raceways constitutes a free vortex. It is characteristic of such flow patterns that the high energy stream injected at the periphery of the vortex tends to remain at the periphery, due to centrifugal force, until it loses energy due to friction. As the elements of the flow lose energy, they are selectively displaced inwardly. An energy stratification develops with a gradient toward the axis of rotation which is uniform around the raceway. As a consequence, the inward displacement, or radial components of flow, also tend to be uniform around the vortex inwardly toward the axis of rotation.

The primary object of this invention therefore is to dissipate the kinetic energy of a gaseous or liquid stream rapidly and completely into random turbulence of small scale eddies.

A further object of this invention is to convert kinetic energy of one or more streams into random turbulence of small scale eddies for the purpose of mixing said streams.

A further object of this invention is to convert the kinetic energy of a stream of liquid suspension into random turbulence for the purpose of flocculating solids suspended in said stream or maintain said solids in suspension while in transit through a pipe line.

The specific nature of this invention together with other objects and advantages will appear from the following description taken in connection with the accompanying drawings in which:

FIGURE 1 is a vertical sectional view of the improved feedwell structure as embodied in a settling tank having peripheral overflow weir, and a rotary raking structure supported from an overhead beam construction.

FIGURE 2 is a plan view of the tank of FIGURE 1.

FIGURE 5 being a top view, FIGURE 6 being a vertical sectional view taken on line 6—6 of FIGURE 5.

FIGURES 7, 8, and 9 show a further modification of the feedwell structure, in which the feed-dispersing countercurrent flow channels are volute-shaped, FIGURE 7 being a plan view, FIGURE 8 being a sectional view on the line 8—8 of FIGURE 7, FIGURE 9 being a vertical sectional view on line 9—9 of FIGURE 7.

FIGURE 10 shows the invention embodied in a multiple compartment thickener or clarifier.

FIGURE 11 shows the top portion of the FIGURE 10 clarifier enlarged, including the feedwell and the top sedimentation compartment.

FIGURES 12 and 13 are diagrammatic vertical sectional views of the feed embodied in a settling tank, illustrating by flow lines the energy-dispersing flow conditions therein.

FIGURE 14 is a schematic sectional view illustrative of the behavior of the streams within the channels and the interaction therebetween to form a zone of shear for complete energy dissipation.

FIGURE 15 is a schematic illustration of various modifications of the device of FIGURE 14.

Figure 16:
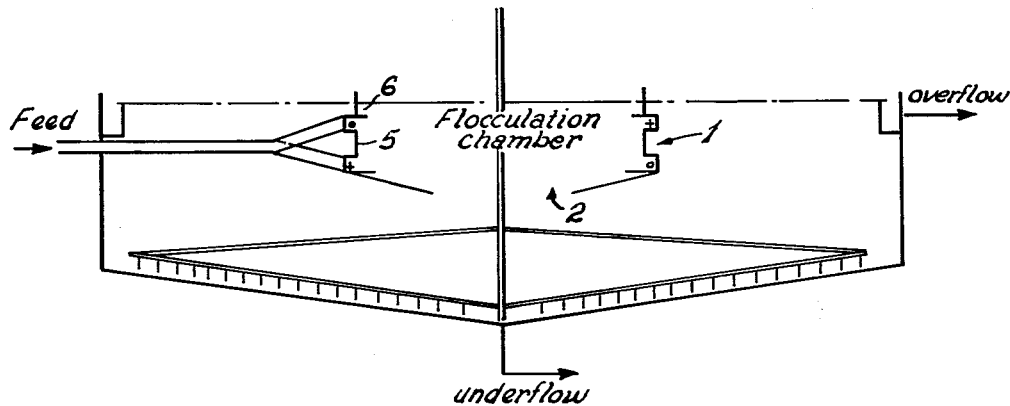

FIGURE 16 is a schematic illustration of the invention utilized in conjunction with a flocculation compartment of a sedimentation thickener or clarifier.

Figure 17:
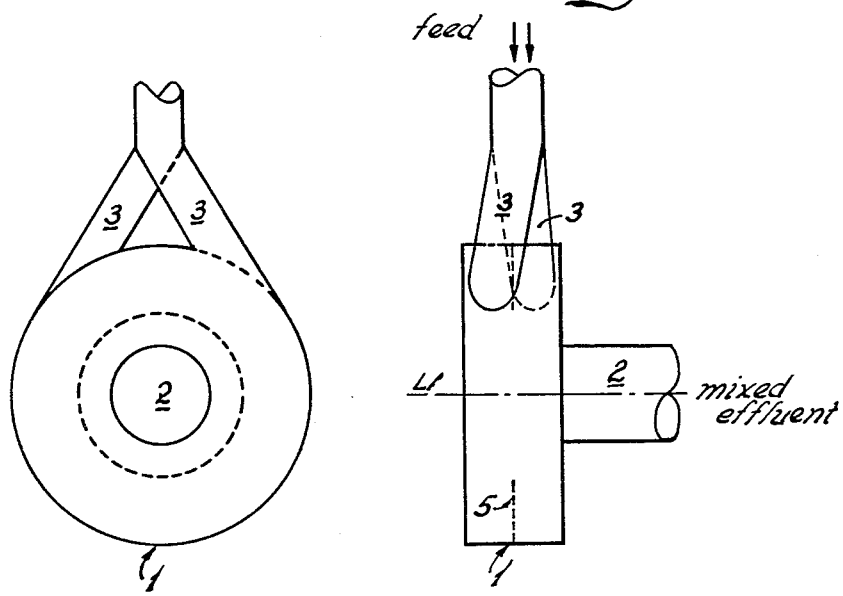

FIGURE 17 is a schematic representation of the invention as a liquid or gas mixer.

As an example, the FIGURE 1, 2, 3 embodiment shows the feedwell structure employed in conjunction with a settling tank 10 having a slightly conical bottom 11, a cylindrical wall 12, a peripheral overflow weir 13 with surrounding overflow receiving launder 14, as well as a central sludge receiving sump with discharge pipe 15. An overhead structure resting upon the tank wall comprises a pair of beams 16 and 17 which support a conventional rotary raking structure 18 with its usual motorized drive mechanism indicated at 19. The overhead beams also support a feedwell structure 20 as by suspension bolts 20a.

The feedwell structure 20 comprises a channel structure 20b providing a pair of circular horizontal coaxial feed channels namely an upper feed channel 21 and a lower feed channel 22, both supplied by a feed conduit 23 which splits into an upper branch 24 leading tangentially into the upper feed channel, and a lower branch 25 leading tangentially into the lower feed channel 22 although in a direction opposite to the direction of the upper tangential feed branch 24.

More precisely, the channel structure 20b providing the two circular coaxial feed channels comprises a cylindrical wall portion 26, an upper annular wall portion 27, a lower annular wall portion 28, as well as an intermediate annular divisional wall portion 29, all extending inwardly from the cylindrical wall portion, the inner diameter $d_1$ of the annular portions 27 and 28 being smaller than the inner diameter $d_2$ of the intermediate divisional annular portion or shelf 29.

From the inner peripheral edge $E_1$ of the upper annular wall portion 27 upwardly there extends an upper cylindrical feedwell portion 30, whereas from the inner peripheral edge $E_2$ downwardly there extends a lower cylindrical feedwell portion 31. The upper end of the feedwell structure has a flange 32 held by the suspension bolts 20a.

Figure 5:
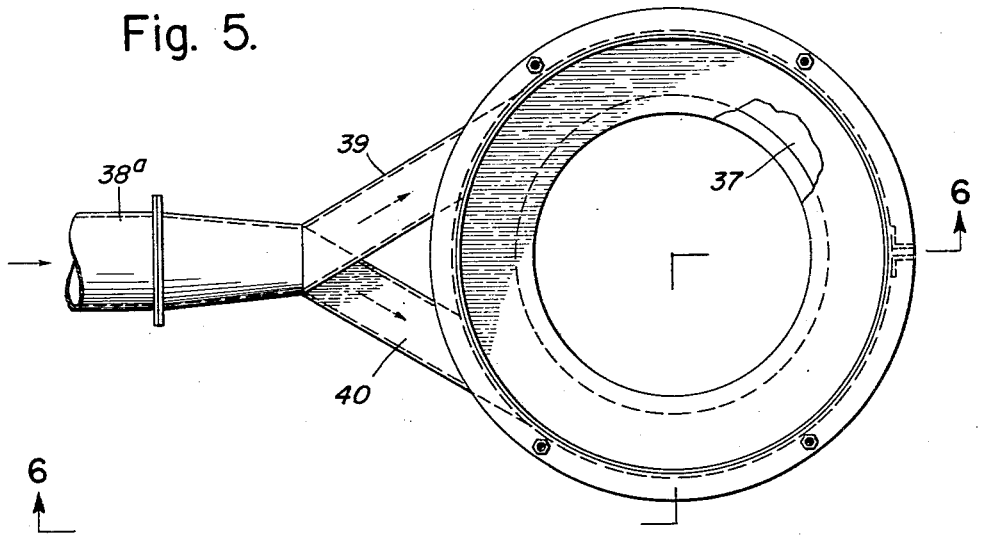
FIGURES 5 and 6 show a modification of the feedwell structure of FIGURES 1, 2, 3.
Figure 6:
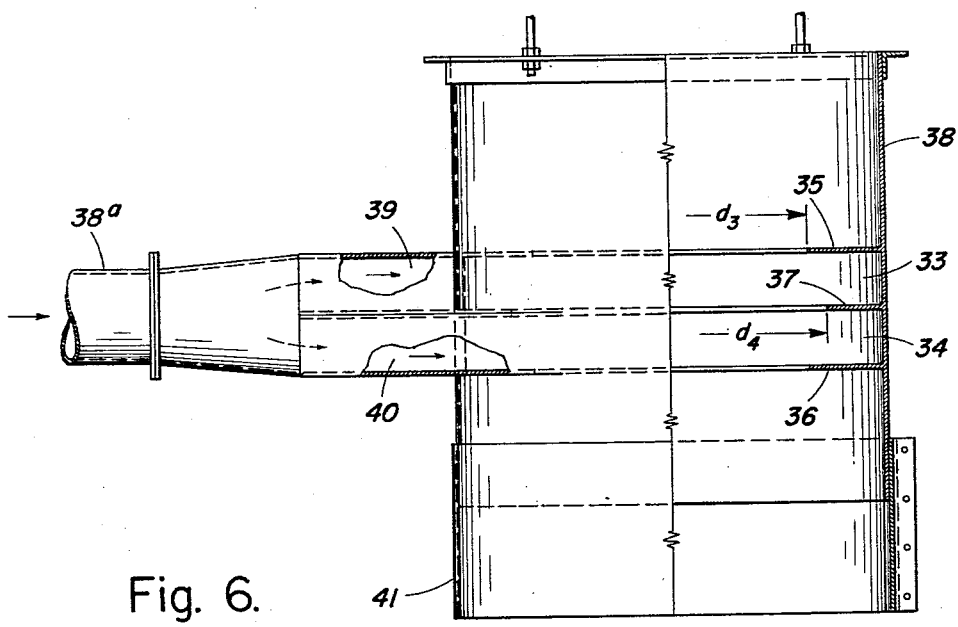

The FIGURES 5 and 6 embodiment forms annular flow channels 33 and 34 by way of providing vertically spaced from one another, horizontal annular shelves 35, 36, 37 extending inwardly from a cylindrical feedwell structure 38. That is to say, the upper and the lower annular shelves 35 and 36 have an inner diameter $d_3$ which is smaller than the inner diameter $d_4$ of the intermediate shelf 37. There is a supply conduit 38a with branches 39 and 40 leading tangentially in opposite directions into the respective flow channels 33 and 34. The lower end of the feedwell structure 38 is surrounded by a cylindrical skirt 41 which is vertically adjustable for the purpose of varying the effective vertical length of the feedwell structure.

Figure 3:
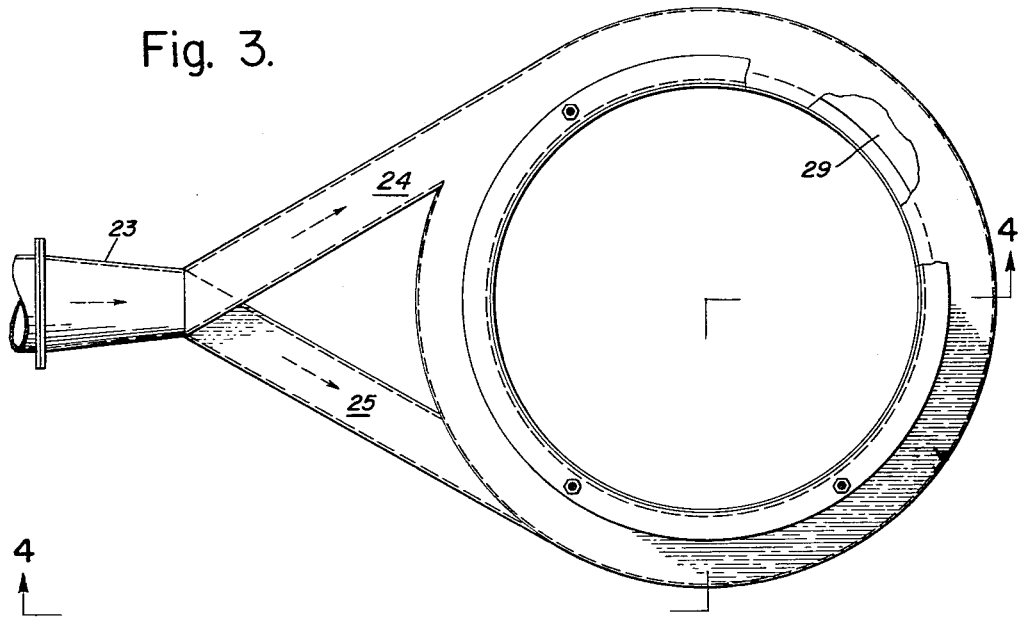
FIGURE 3 is an enlarged detail top view of the feedwell structure shown in FIGURE 2.
Figure 4:
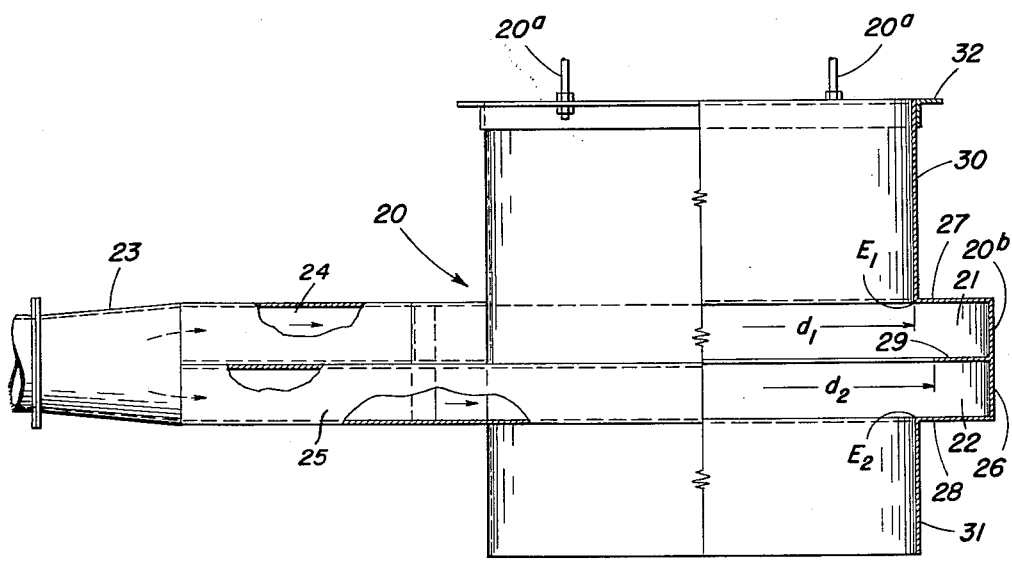
FIGURE 4 is a vertical sectional view taken on line 4—4 of FIGURE 3.

The FIGURES 7, 8, 9 embodiment differs from the preceding embodiments of the channel structure by providing volute-shaped circular flow channels instead of the uniform annular shape of the circular flow channels of the FIGURES 4 and 6 embodiments. Hence, the FIGURES 7 to 9 embodiment shows a channel structure S which has an upper flow channel 42, the volute shape of which narrows down from an initial width $a$ to a final width $b$, and a lower flow channel 43 the volute of which narrows down from an initial width $c$ to a final width $d$. Feed liquid is supplied by feed conduit 44 having a branch 45 leading into the upper flow channel 42, and a branch 46 leading into the lower flow channel 43.

The channel structure S is constituted of an upper annular horizontal wall portion 46 having its inner edge defined by diameter $d_5$, and its outer edge defined by the volute shape of the upper flow channel 42; a lower annular horizontal wall portion 47 having its inner edge defined by an inner diameter $d_6$, and its outer edge defined by the volute shape of the lower flow channel 43; an intermediate dividing annular horizontal wall portion 48 having its inner edge defined by an inner diameter $d_7$ and its outer edge defined by the volute shape of the lower flow channel 43; all the diameters $d_5$, $d_6$, $d_7$, being concentric with respect to one another, the diameters $d_5$ and $d_6$ being smaller than the diameter $d_7$.

It is noted that the volute shaped channels shown in FIGURES 7, 8 and 9 can be less than 360°. It will be obvious from an examination of FIGURE 7 that the channels may for example, be volute shaped channels 90°, 180° or 270° arcs with the feed supply conduits spaced 90°, 180° or 270° apart respectively. Liquid streams flowing in a volute channel of 90°, 180° or 270° will be incrementally inwardly displaced. Two such channels juxtaposed, as shown in FIG. 7, will cause liquid flowing within the channels to flow inwardly in opposite directions to form a zone of shear according to the teaching of this invention.

It is also noted that the use of an upper boundary wall 27, 35 and 46 is (as in FIGS. 4, 6 and 9 respectively) preferred. However, the liquid surface normally existing in a feedwell can be used as an upper boundary surface.

The multiple compartment thickener or clarifier as exemplified in the FIGURES 10 and 11 embodiment of the invention comprises the tank M proper having a bottom 49 and a top 50, as well as intermediate bottoms or so-called trays 51, 52, 53 respectively. In this way, the tank is sub-divided into a number of superposed sedimentation compartments, namely a top compartment 54, a pair of intermediate compartments 55 and 56, and a bottom compartment 57. These compartments operate in parallel although within a hydraulically balanced system in that each compartment receives its share of feed supply liquid and has its own overflow discharge of clarified liquid as well as its own sludge withdrawal means.

These sedimentation or clarification compartments are defined by the aforementioned intermediate bottoms or trays 51, 52, 53, each of these trays having a central opening associated with an annular sludge collecting sump surrounding the opening. Each sedimentation compartment furthermore is served by a set of rotary bladed rake arms for moving the sediment or sludge over the compartment bottom into the respective annular sump for withdrawal therefrom. Each such set of rake arms is rigidly connected with and supported by an intermediate rotary feed cylinder or feedwell, all of which intermediate feedwells in turn are rigidly connected as by spider structure to a central vertical shaft driven in the usual manner. In this way the central shaft constitutes a rigid structure with the respective sets of rake arms by way of the intermediate feedwell cylinders carrying the rake arms. Furthermore, each intermediate rotary feedwell cylinder has sludge-sealing relationship with the surrounding inner upstanding cylinder wall of the surrounding annular sludge sump, and each such intermediate feedwell cylinder extends from one compartment down through the tray opening into the next lower compartment, whereby the lower end portion of each such feedwell cylinder surrounds the upper end portion of the next lower feedwell cylinder thereby providing between respective feed cylinders an annular passage through which each respective compartment may receive its share of the feed liquid supplied to the top of the tank.

That is to say, the intermediate bottom 51 has an annular sludge collecting sump or trough 51a defined by an outer cylindrical wall 51b, an inner cylindrical wall 51c rising above the bottom 51, and by an annular flat bottom 51d. The inner wall 51c of this annular sump surrounds the first intermediate cylinder 61 of diameter $d_9$ providing therewith a labyrinth sludge seal 62 comprising a bell-shaped portion 62a surrounding the cylindrical wall 51c to constitute an overlap $O_2$.

The upper end portion of the intermediate feedwell cylinder 61 is surrounded by the lower end portion of a stationary main feedwell cylinder W of diameter $d_8$ rigid with the top plate 50 of the tank, and provided with the influent feed introducing channel structure means described in detail in the FIGURES 1–9 embodiments and here designated summarily by the numeral 63 providing annular countercurrent feed channels 63a and 63b in the stationary main feedwell cylinder W. Thus, the initial or main feedwell W forms with the next following intermediate feedwell cylinder 61 an overlap $O_1$ and thereby an annular feed passage $p_1$ leading into the compartment 54. The intermediate feedwell cylinder 61 is concentric with and rigidly connected to the vertical shaft 65, by means of sets of spider arms 66, while a set of rake arms 67 extend rigidly from the bell shaped portion 62a thus being rigidly connected through the feedwell cylinder 61 with the vertical shaft 65.

Similarly, the next lower intermediate feedwell cylinder 67a having a diameter $d_{10}$ is rigidly carried by the vertical shaft 65 through spider arms 65a, and forms with the preceding feedwell cylinder 61 an overlap $O_2$ constituting an annular feed passage $p_2$ leading into compartment 55. The feedwell cylinder 67a has a sludge seal 68 with tray 52, similar to the one described above for compartment 54. The tray 52 has an annular sludge collecting sump 69 into which sludge from the tray is delivered by a set of rake arms 70 rigidly carried by the feedwell cylinder 67a. Again, the next lower or last feedwell cylinder 71 having a diameter of $d_{11}$ is rigidly carried by the shaft 65 through spider arms 65b and forms with the preceding feedwell cylinder 67a an overlap $O_3$ constituting an annular feed passage $p_3$ leading into compartment 56. The feedwell cylinder 71 forms with tray 53 a sludge seal 72 similar to sludge seals 62 and 68 of the preceding compartments. The tray 53 has an annular sludge collecting sump 73 into which sludge is delivered by a set of rake arms 74 rigidly carried by the feedwell cylinder 71. Thus, the balance or last share of the feed liquid passes from feedwell cylinder 71 into the bottom compartment 57 where a set of rake arms 75 rigidly carried by the vertical shaft 65 delivers sludge over the tank bottom 49 into a conical sump 76 for withdrawal through discharge pipe 77.

Thus, it will be understood that in the operation of this multiple tray clarifier feed liquid is proportioned in substantially equal shares to the respective compartments by way of the respective annular feed passages $p_1$, $p_2$, $p_3$. Through the novel feed introducing means or channel structure 63 feed liquid in the initial main feedwell W is uniformly dispersed across the area thereof with the influent energy of the liquid similarly dissipated, so that uniform shares of the feed liquid may be scalped off the vertical supply stream through the annular feed passages $p_1$, $p_2$, $p_3$. Clarified liquid passes from the individual compartments by way of respective overflow pipes 78, 79, 80, 81 while sludge from the compartments is withdrawn or pumped in a controlled manner by way of sludge discharge pipes 82, 83, 84 and 77, the pumping means here not being shown.

Since multiple compartment tanks of this kind are often used in the clarification treatment of sugar juice, the top portion of the tank shown in FIGURE 11 comprises rotary scum skimming means 85 within the initial or main stationary feedwell cylinder W. These skimmers rotating with the shaft 65 sweep the scum into a stationary radial receiving trough 86 having a scum discharge pipe 87. The vertical shaft 65 is supported from a superstructure 88 upon which is mounted the drive mechanism indicated at 89, the lower end of the shaft having a conical scraper 81a in the conical sump 76 (see FIGURE 10).

A diagrammatic presentation of the effect of influent dispersion and energy dissipation is rendered in the FIGURES 12 and 13. This presentation indicates within the feedwell F a zone $e$ of uniform mixing or homogenization across the feedwell area resulting from the countercurrent streams of feed liquid in the respective feed channels $F_1$ and $F_2$ interfering with one another as indicated by arrows A interfering with arrows B (see FIGURE 12). The respective countercurrent flow directions in channels $F_1$ and $F_2$ are indicated by plus and minus signs respectively. Subjacent to zone $e$ there is indicated within the feedwell a zone $f$ of mollification and flow-rectification, which is followed by a zone of the depth $g$ through which the previously homogenized influent stream mushrooms out or spreads substantially horizontally and by way of transition into the quiescent body of water surrounding the feedwell in the tank. The flow lines in the quiescent body indicate the improved utilization of the available tank volume to effect settling (indicated by flow lines $k$) as well as clarification (indicated by flow lines $l$). This improved tank utilization and efficiency in thus attributable to the improved manner of introducing the feed liquid and of dissipating the influent energy of the feed liquid in such a manner that there is established a uniform distribution of flow not only radially in all directions from the lower end of the feedwell, but also through a depth such as indicated by the depth of the transitional zone $g$.

FIGURE 14 shows a schematic plan view and a cross-sectional illustration of the apparatus of the invention comprising a hollow body of revolution 1 which may be elliptical, as shown, or circular (see FIGURE 17), having at least one effluent passage 2 and two or more feed conduits 3 which supply liquid tangentially into each channel for countercurrent rotation within adjacent channels.

The plus signs indicate a flow away from the viewer and the minus signs indicate that the flow is toward the viewer. A partition wall 5 separates the two streams along a portion of their depth since it does not project as far toward the longitudinal axis, LA or the axis of rotation of the streams as do walls 6. As long as the circulating streams in the raceways retain tangential velocity, centrifugal force tends to hold them in the channels defined by elements 1, 5 and 6. As the two streams are displaced inwardly toward the axis of rotation, they pass first beyond the separating wall 5 and shear one against the other with a velocity differential equal to twice the speed of either stream. According to the invention, the directional flow energy of the influent liquid is thus converted into uniform random turbulence throughout this transverse zone of shear which is surrounded and peripherally defined by the channel means, and from this transverse zone the liquid is in turn displaced axially constituting a stream of homogeneous although turbulent character and of uniform cross-sectional velocity as well as density with gradually decaying turbulence, as is well illustrated diagrammatically in FIGS. 12, 13, 14. Thus, the gross tangential flow components of the two streams are neutralized. The resulting mass of turbulent fluid no longer exerts centrifugal force and is displaced inwardly past the boundary walls 6 by elements of the flow which retain or have not lost their tangential velocity. Since the streams stay within side members 6 until after they shear and are converted into turbulent vortices none of the flow escapes passing through the shear zone. It is therefore an inherent characteristic of the structure that dissipation of the infeed energy will be completed.

Usually, the two channels of the energy dissipating structure of the invention are placed as closely adjacent as possible, as shown in FIGURE 14. The closeness of the two shearing streams, together with the double differential velocity gives maximum possible conversion to the fine grain or small scale turbulence which tends to decay most quickly. Sometimes, however, it is desirable to create a larger scale, more persistent turbulence for example as an aid to flocculation. This can be accomplished by separating the raceways which reduces the velocity gradient in the shear zone. This modification is diagrammatically illustrated in FIGURE 16. It will be apparent, therefore, that the scale of turbulence can be varied or controlled to whatever is desirable by varying the spacing between channels.

The several views of FIGURE 15 show a few of the various forms that the device may take. It will be apparent from these views that the device consists essentially of a hollow body 1 with an elliptical or circular plan form or other appropriate closed curve configuration about a longitudinal axis, LA, the interior of this body is divided by one or more inwardly directed partition walls, 5, into two or more raceways, in one of which liquid flows clockwise, C and in which the next adjacent channel contains a liquid flowing counterclockwise, CC. It will be noted also, that the open end or ends 2 of the body will be smaller than the opening defined by the partition wall(s) 5. Thus, a zone of shear must form within the confining elements, 1 and 6, of the apparatus.

FIGURE 17 is a schematic representation of the invention as a "flash mixer" for a single stream of immisible liquid, or two separate streams of liquid. As a mixer, the device has distinct advantages in its simplicity, lack of moving parts, while capable of providing thorough and intimate mixing. The mixing device 1 of FIGURE 16 resembles and operates essentially in the same manner as the feedwell structure described above. The material to be mixed is split into two streams of equal energy momentum by conduits 3. These streams enter respective channels tangentially in such a way that the streams have opposite rotations as described above. As the flow is displaced inwardly past the dividing member 5 the energy of the two streams is converted into random turbulence of the type highly suitable for promoting intimate mixing.

I claim:

1. Flow energy dispersing apparatus comprising a hollow body of revolution having a longitudinal axis and transverse ends at least one of which has a through-flow opening formed with at least one intermediate partition means extending inwardly toward said axis and defining an intermediate opening larger than said through-flow, said partition means also defining adjacent channel-means within said body, influent conduit means to simultaneously feed separate streams of a fluid tangentially and countercurrently into the interior of said respective channel-means, whereby said channel-means are adapted and arranged to cause displacement of the counter-rotating fluid streams confined thereby inwardly into a confined common transverse zone of shear between the respective fluid streams thus inwardly displaced within said body.

2. Flow energy dispersing apparatus comprising a hollow cylindrical body having a longitudinal axis and transverse ends at least one of which is defined by an annular wall member extending inwardly from one end of said cylinder towards said axis and which defines a through-flow opening, an intermediate partition means extending from said body toward said axis and defining an intermediate opening larger than said through-flow opening, said partition means also defining adjacent channel-means within said body, influent conduit means to simultaneously feed separate streams of a fluid tangentially and countercurrently into the interior of said respective channel means, whereby said channel-means are adapted and arranged to cause displacement of the counter-rotating fluid streams confined thereby inwardly into a transverse zone of shear between the respective fluid streams thus inwardly displaced within said body.

3. Flow energy dispersing apparatus comprising a hollow cylindrical body having a longitudinal axis and transverse ends at least one of which has a through-flow opening defined by an annular wall member extending inwardly from one end of said cylinder toward said axis, at least one intermediate partition means within said body extending from the inner periphery thereof towards said axis in the form of an annular shelf extending in a transverse plane defining at least one intermediate opening larger than said through-flow opening, said partition means dividing the interior of said body into channel-means, influent conduit means for feeding simultaneously separate streams of a fluid tangentially into each said channel-means to flow as a vortex within one said channel means rotating in a direction opposite to the vortex flowing within the adjacent channel-means, whereby said said channel-means are adapted and arranged to cause displacement of the counter-rotating fluid streams confined thereby inwardly into at least one transverse zone of shear between the respective fluid streams thus inwardly displaced within said body.

4. Flow energy dispersing apparatus comprising at least a first and a second inwardly open concavely curved channel member incrementally decreasing in depth along their length, said channel members together defining a hollow channel structure having transverse ends at least one of which has a through-flow opening, influent conduit means to simultaneously feed separate streams of a fluid countercurrently into said respective channel members to establish therein respective counter-rotating streams, whereby said channel members are adapted and arranged to cause displacement of the fluid streams confined thereby inwardly into a transverse confined common zone of shear between the respective fluid streams thus inwardly displaced within said structure.

5. Flow energy dispersing apparatus comprising a substantially annular channel structure having at least a first and a second inwardly open substantially annular channel-means to constitute a hollow channel structure having transverse ends at least one of which has a through-flow opening, influent conduit means to simultaneously introduce separate streams of a fluid tangentially and countercurrently into said respective channel-means to establish therein respective counter-rotating streams, whereby said channel-means are adapted and arranged to cause displacement of the counter-rotating fluid streams confined thereby into a transverse confined common zone of shear between respective fluid streams thus inwardly displaced within said structure.

6. A method for dispersing flow energy, which comprises maintaining one continuously fed stream of fluid in one direction along one radially outwardly as well as laterally confined path, maintaining another continuously fed stream of fluid along a separate radially outwardly as well as laterally confined path in the opposite direction, maintaining said oppositely directed streams adjacent to each other substantially about a common axis, simultaneously discharging the fluid of the respective streams toward said axis into a transverse confined common zone of shear between the fluids of the two oppositely directed streams, whereby the directional flow energy of the streams is converted into random turbulence throughout said transverse confined common zone of shear surrounded by said radially confined paths, and axially displacing the liquid from said zone of random turbulence by said continuously fed streams.

7. A method of dispersing the flow of energy of solids carrying feed liquid in a body of quiescent liquid in a tank having overflow means for the clarified liquid, which comprises maintaining submerged in a central zone of said body of liquid one continuously fed stream of the feed liquid along one radially outwardly as well as laterally confined path in one direction, maintaining submerged in said central zone a separated continuously fed stream of the feed liquid along another radially outwardly as well as laterally confined path in the opposite direction, maintaining said oppositely directed streams adjacent to each other substantially about a common axis so that the liquid of the respective streams is displaced toward said axis into a transverse confined common zone of shear between the liquids of the two oppositely directed streams, whereby the directional flow energy of the streams is converted into random turbulence throughout said confined common transverse zone of shear surrounded by said radially confined paths, and axially displacing the liquid from said zone of random turbulence into said body of quiescent liquid by said continuously fed streams.

8. In a settling tank having overflow means for clarified liquid determining the liquid level in the tank, improved centrally disposed feedwell means for introducing solids carrying feed liquid into a body of relatively quiescent liquid undergoing clarification in the tank to discourage disturbance of the clarification operation by the flow energy of the influent feed liquid; characterized thereby that the feedwell means comprises a substantially annular channel structure surrounded by said body of liquid and providing at least a pair of substantially annular inwardly open horizontal flow channels substantially coaxial as well as vertically adjacent with respect to one another, and influent connections for tangentially and countercurrently introducing separate streams of feed liquids simultaneously into the respective channels for establishing countercurrently directed circular streams of liquid in the respective channels, said annular flow channels thus being associated with respect to each other in such a manner that the influent liquids being displaced inwardly from the respective streams along their inner peripheries have their respective tangentially directed energy and velocity components interactingly dispersed in a transverse confined common zone of merger and of random turbulence within the area defined by the surrounding channels, whereby the influent liquid being displaced by said streams from said area of random turbulence will issue into the surrounding body of liquid radially in all directions.

9. The feedwell means according to claim 8, characterized thereby that the channel structure comprises a cylindrical portion and annular shelf portions extending inwardly therefrom and having vertical spacing with respect to one another, which spacing defines the effective width of said pair of flow channels, the opening in the intermediate annular shelf portion being of larger diameter than the one upwardly and the one downwardly spaced therefrom.

10. The feedwell means according to claim 8, characterized thereby that the flow channels are spaced axially from each other a distance providing shear interaction between said streams at a desired axial gradient of shear.

11. The feedwell according to claim 8 in which the channels are volute shaped.

12. Feedwell means according to claim 8, wherein said annular channel structure has an annular bottom of shallow frusto-conical shape defining an outflow opening appreciably smaller than the area of said transverse zone of merger surrounded by said channels, and wherein said channels are spaced axially a distance insuring interaction between said streams at a desired axial gradient of shear adapted to favor flocculation of solids suspended in the feed.

13. In a settling tank having overflow means for clarified liquid determining the liquid level in the tank, improved centrally disposed feedwell means for introducing solids carrying feed liquid into a body of relatively quiescent liquid undergoing clarification in the tank to discourage disturbance of the clarification operation by the flow energy of the influent feed liquid; characterized thereby that the feedwell means comprises a cylindrical vertical feedwell structure surrounded by said body of quiescent liquid and having disposed therein a horizontal shelf constituting an annular partition extending inwardly from said cylindrical structure and below the liquid level, and further having submergedly disposed therein means above and below said partition and defining one raceway above as against another raceway below said partition, and feed inlet means for simultaneously introducing separate oppositely directed streams of liquid tangentially into said raceways for maintaining therein countercurrent circular streams of liquid, whereby a transverse confined common zone of merger and of random turbulence is established in the area surrounded by said annular partition, due to displacement inwardly from said races of the liquid of said streams, and whereby the liquid being displaced by said streams from said zone of random turbulence will issue into the surrounding body of liquid radially in all directions toward said overflow means.

14. A method for dispersing flow energy according to claim 6, wherein said paths are axially spaced a distance such as to provide a corresponding axial gradient of shear effective and sufficient to produce solids flocculation.

15. A method of dispersing the flow energy of solids carrying feed liquid according to claim 7, wherein said paths are axially spaced a distance such as to provide a corresponding axial gradient of shear adapted to produce solids flocculation.

16. In a settling tank having overflow means for clarified liquid determining the liquid level in the tank, improved feedwell means for introducing solids carrying feed liquid into a body of relatively quiescent liquid undergoing clarification in the tank to discourage disturbance of the clarification operation by the flow energy of the influent feed liquid; characterized thereby that the feedwell means comprises a substantially annular channel structure surrounded by said body of liquid and providing at least a pair of substantially annular inwardly open flow channels substantially coaxial as well as axially adjacent with respect to one another, and feed inlet means for countercurrently introducing respective separate streams of feed liquids simultaneously into the respective channels for establishing countercurrently directed substantially circular streams of liquid in the respective channels, said annular flow channels thus being associated with respect to each other in such a manner that the influent liquids being displaced inwardly from the respective streams along their inner peripheries have their respective tangentially directed energy and velocity components interactingly dispersed in a transverse confined common zone of merger and of random turbulence within the area defined by the surrounding channels whereby the influent liquid being displaced by said streams from said area of random turbulence will issue into the surrounding body of liquid radially in all directions.

17. In a settling tank having overflow means for clarified liquid determining the liquid level in the tank, improved feedwell means for introducing solids carrying feed liquid into a body of relatively quiescent liquid undergoing clarification in the tank to discourage disturbance of the clarification operation by the flow energy of the influent feed liquid; characterized thereby that the feedwell means comprises a cylindrical feedwell structure surrounded by said body of quiescent liquid and having disposed therein a shelf constituting an annular partition extending inwardly from said cylindrical structure and below the liquid level, and further having submergedly disposed therein means axially disposed at either side of said partition and defining one raceway on one side as against another raceway on the other side of said partition with both raceways inwardly open, and feed inlet means for introducing separate oppositely directed streams of liquid into said raceways for maintaining therein countercurrent substantially circular streams of liquid, whereby a transverse confined common zone of merger and of random turbulence is established in the area surrounded by said annular partition, due to displacement inwardly from said races of the liquid of said streams, and whereby the liquid being displaced by said streams from said zone of random turbulence will issue into the surrounding body of liquid radially in all directions toward said overflow effluent means.

(References on following page)

References Cited in the file of this patent

UNITED STATES PATENTS

| | | |
|---|---|---|
| 930,193 | Kittle | Aug. 3, 1909 |
| 1,093,994 | Kaibel | Apr. 21, 1914 |
| 1,466,795 | Gibson | Sept. 4, 1923 |
| 1,517,598 | Stevenson | Dec. 2, 1924 |
| 1,874,209 | Schnabel | Aug. 30, 1932 |
| 2,098,467 | Sayers et al. | Nov. 9, 1937 |
| 2,484,577 | Murphy | Oct. 11, 1949 |
| 2,678,730 | Coulter | May 18, 1954 |

FOREIGN PATENTS

| | | |
|---|---|---|
| 546,334 | Germany | Mar. 11, 1932 |